O. J. MOONEY.
RESPIRATOR.
APPLICATION FILED NOV. 21, 1916.

1,232,956.

Patented July 10, 1917.

WITNESSES

INVENTOR
O. J. Mooney
BY Victor J. Evans
ATTORNEY

UNITED STATES PATENT OFFICE.

OWEN JOSEPH MOONEY, OF KINGSTON, NEW YORK.

RESPIRATOR.

1,232,956.  Specification of Letters Patent.  Patented July 10, 1917.

Application filed November 21, 1916. Serial No. 132,672.

*To all whom it may concern:*

Be it known that I, OWEN J. MOONEY, a citizen of the United States, residing at Kingston, in the county of Ulster and State of New York, have invented new and useful Improvements in Respirators, of which the following is a specification.

This invention comprehends the provision of a new article of manufacture designed for use on animals to distend the nostrils with a view of facilitating respiration.

In carrying out the invention I provide an article of the above mentioned character which is simple in construction, inexpensive to manufacture, and designed to be readily attached to the harness and supported in position for use as well as being very efficient for the purpose intended.

The nature and advantages of the invention will be better understood when the following description is read in connection with the accompanying drawing, the invention residing in the construction, combination and arrangement of parts as claimed.

In the drawing forming part of this specification like numerals of reference indicate similar parts in the several views and wherein:—

Figure 1:
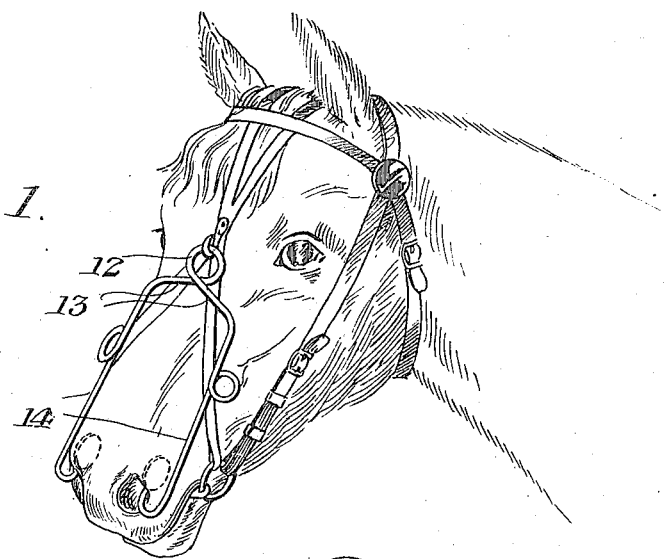
Figure 1 is a view showing the device arranged in position for use.
Figure 2:
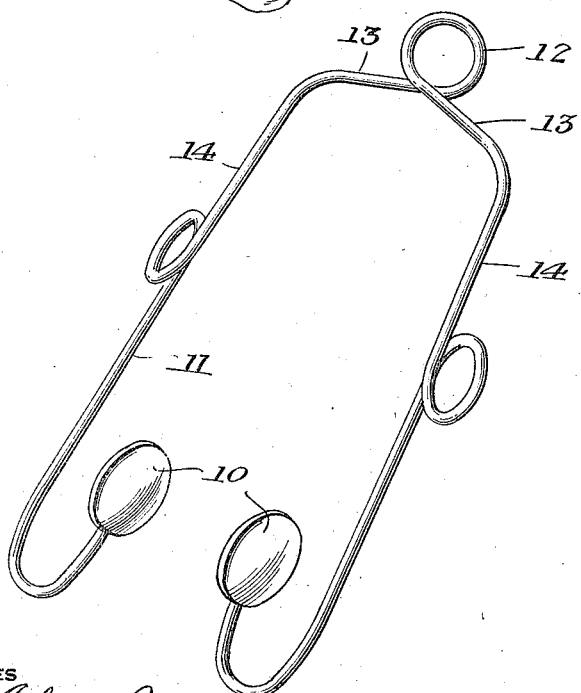
Fig. 2 is a perspective view of the device.

Before entering into a detail description of what is herein shown, I desire to have it understood that the drawing merely illustrates one and the preferred embodiment of the invention which is not considered restrictive, and that such changes in the production of the article may be resorted to, when desired, as fall within the scope of what is claimed.

The invention embodies primarily a pair of identically constructed members 10 which may be constructed from any suitable material in the nature of pads which are adapted to be arranged in the nostrils of the animal upon which the device is used. The members 11 are contemplated being connected in any suitable manner to effect an adjustment of the same so that the nostrils of the animal will be gently distended in order to facilitate breathing, and as shown in this specific instance the members or pads 10 are carried by the extremities of a frame 11 constructed from resilient material. The frame is formed from a single length of any suitable material, such as wire or the like possessing the requisite degree of resiliency to effect a proper adjustment between the pads 10 for the purpose above stated. The material constituting the frame is bent at a point approximately midway of its length and shaped to provide a loop 12, the terminals of which are extended laterally as at 13, while the material forming the continuation of the extensions 13 is disposed at a substantially right angle thereto to provide limbs 14. The members 11 have their lower portions curved inwardly and upwardly toward each other to support the pads 10 in confronting relation. The pads may be secured to the frame in any suitable manner. The loop 12 is provided to permit the article to be conveniently associated with the harness in the manner illustrated in Fig. 1, thus conveniently supporting the article in position for use. The pads 10 are arranged within the nostrils of the animal and by reason of the inherent resiliency of the material from which the frame is constructed, the pads are adjusted relatively to gently distend the nostrils to allow the animal to breathe more freely.

What is claimed is:—

A nostril distender for animals, constructed from a single strand of resilient material into substantially U-shaped formation, the parallel members of the device being formed at a point in their length with resilient coils, while said members have their free ends extended inwardly and toward the closed end, pads carried by said free ends and disposed in confronting relation, and the closed end of said device being formed with a centrally disposed ring whereby the device may be suspended from a suitable part of the harness.

In testimony whereof I affix my signature.

OWEN JOSEPH MOONEY.

Copies of this patent may be obtained for five cents each, by addressing the "Commissioner of Patents, Washington, D. C."